United States Patent [19]

Cross et al.

[11] 4,120,681
[45] Oct. 17, 1978

[54] METHOD OF THERMAL TREATMENT OF GLASS IN A FLUIDIZED BED

[75] Inventors: Raymond Peter Cross, Preston; Derek Edward Thomas, Chester, both of England

[73] Assignee: Pilkington Brothers Limited, St. Helens, England

[21] Appl. No.: 849,631

[22] Filed: Nov. 8, 1977

Related U.S. Application Data

[63] Continuation of Ser. No. 717,263, Aug. 24, 1976, abandoned.

[30] Foreign Application Priority Data

Aug. 29, 1975 [GB] United Kingdom ............... 35770/75
Jun. 10, 1976 [GB] United Kingdom ............... 24123/76

[51] Int. Cl.² ............................................. C03B 27/00
[52] U.S. Cl. ........................................ 65/114; 65/104; 65/111; 165/104 F
[58] Field of Search ..................... 65/104, 111, 114; 165/104 R, 104 M, 104 F

[56] References Cited

U.S. PATENT DOCUMENTS

| 3,423,198 | 1/1969 | McMaster et al. | 65/114 |
| 3,475,150 | 10/1969 | Bishop et al. | 65/50 R |

FOREIGN PATENT DOCUMENTS 614,005 12/1960 Italy ............................................. 65/114

*Primary Examiner*—Arthur D. Kellogg
*Attorney, Agent, or Firm*—Burns, Doane, Swecker & Mathis

[57] ABSTRACT

Glass is thermally treated by contacting the glass with a gas-fluidized particulate material of non-compacted particle structure which is such that the apparent density of the particles is less than the actual density of the material forming the particles. The buoyant particles constitute a gas-fluidized bed in a quiescent uniformly expanded state of particular fluidization, and the material of the particles and the temperature of the bed are selected so that the heat transfer coefficient of the bed is sufficient to produce a desired thermal treatment, for example thermal toughening of hot glass.

18 Claims, 3 Drawing Figures

METHOD OF THERMAL TREATMENT OF GLASS IN A FLUIDIZED BED

This is a continuation of application Ser. No. 717,263, filed Aug. 24, 1977, now abandoned.

BACKGROUND OF THE INVENTION

1. Field of the Invention

This invention relates to the thermal treatment of glass, and more especially to the thermal toughening of glass articles, for example flat glass or bent glass sheets. Such thermally toughened glass sheets may be for use singly as a motor vehicle windscreen, or as part of a laminated motor vehicle windscreen, a side light or rear light for a motor vehicle, or for use in the construction of windscreen assemblies for aircraft and railway locomotives, or in the construction of windows for ships, or for architectural uses. Other glass articles such as pressed or blown glass articles may be thermally toughened by the method of the invention.

2. Description of the Prior Art

The ultimate tensile strength of a glass article can be increased by a thermal toughening process in which the glass is heated to a temperature approaching its softening point, followed by rapid chilling of the glass surfaces to induce centre-to-surface temperature gradients through the thickness of the glass. These temperature gradients are maintained as the glass is cooled through its strain point. This results in compressive stress in the surface layers of the glass sheet with compensating tensile stress in the central core of the thickness of the glass sheet.

Usually this thermal toughening process is carried out using chilling air directed uniformly at both surfaces of the glass sheet but it is difficult to obtain a high degree of toughening using air flows, particularly when toughening glass sheets of 3 mm thickness or less. Attempts to increase the degree of toughening of a glass sheet by increasing the rate of flow of cooling air can give rise to loss of optical quality of the surfaces of the glass and distortion of the shape of the glass sheet due to the buffeting action of the chilling air.

In another thermal toughening process a glass sheet at a temperature near to its softening point is quenched in a chilling liquid. High stresses can be produced by this method. The glass sheets have to be cleaned after quenching.

Thermal toughening of a glass sheet has also been proposed by a method in which a hot glass sheet is immersed in what, in practice, was a freely-bubbling fluidised bed of solid particles, for example sand.

Such a process has not been brought into commercial use hitherto.

The major problem which we have found when attempting to operate such a bed for the thermal toughening of glass is the high incidence of fracture of the glass sheets during their treatment in the fluidised bed. The fracture of a glass sheet while being quenched in a freely-bubbling fluidised bed is thought to be caused by the induction of destructive tensile stresses in the leading edge of the glass sheet due to non-uniform cooling as the leading edge enters the bed of particles in a state of bubbling or aggregative fluidisation.

Loss of glass sheets due to fracture is particularly serious when attempting to toughen thin sheets of glass, for example of thickness from 2.3 mm to 4.0 mm, to a high stress value, and has been such as to render the process unacceptable for the commercial production of toughened glass sheets for use in car windscreens for example. The problem of fracture also arises to a lesser but still commercially significant extent when seeking to toughen thicker sheets, for example up to 8 mm thick.

A freely-bubbling bed in a state of aggregative fluidisation has also found to damage hot glass sheets immersed in it. This is due to the irregular forces to which the glass is subjected in a freely-bubbling bed. This can give rise both to changes of overall shape and to more localised surface damage, the former occurring particularly with thinner glass sheets such as those of 2 mm to 3 mm thickness. Such damage as changes of shape may give rise to difficulties in lamination, and surface damage may give rise to unacceptable optical quality when the sheet is used as a window or as a component of a laminated window.

The present invention is based on the discovery that the use of a gas-fluidised bed of material of non-compacted particle structure in a quiescent uniformly expanded state of particulate fluidisation unexpectedly produces adequate stresses in glass sheets quenched in it and substantially reduces loss of glass sheets due to fracture in the bed or to change of shape or surface damage so that a successful commercial yield is achieved.

SUMMARY

The invention provides a method of thermally treating glass in which the glass is contacted with a gas-fluidised particulate material of non-compacted particle structure which is such that the apparent density of the particles is less than the actual density of the material forming the particles. The particulate material constitutes a gas-fluidised bed in a quiescent uniformly expanded state of particulate fluidisation. The material of the particles and the temperature of the bed are so selected that the heat transfer coefficient of the fluidised bed is sufficient to produce a desired thermal treatment of the glass as it cools in the bed.

The method is employed for thermally toughening glass. The hot glass is immersed in the gas-fluidised bed and desired toughening stresses are induced in the glass as it cools in the bed.

The fluidised bed of particulate material in a quiescent uniformly expanded state of particulate fluidisation, which is employed in carrying out the invention, can be defined in terms of the velocity of gas flow through the bed and the expanded height of the bed. The quiescent uniformly expanded state of particulate fluidisation exists between a lower limit of gas velocity at incipient fluidisation, that is the velocity at which the particles just become suspended in the uniformly distributed upwardly flowing gas, and an upper limit of gas velocity at which maximum expansion of the bed occurs while maintaining a free surface at the top of the bed.

The upper limit of fluidisation gas velocity may exceed by a small amount the velocity at which the first clearly recognisable bubble, for example 5 mm in diameter, is seen to break the calm surface of the bed. One or two such bubbles may be visible at that gas velocity.

A higher gas velocity results in the development of extensive bubbling in the bed and at the onset of such bubbling there is partial collapse of the bed height.

We believe that by quenching the sheet in a gas-fluidised bed which is in quiescent uniformly expanded state of particulate fluidisation, any transient tensile stresses induced in the leading edge of the glass sheet on entry into the fluidised bed are not so severe as to endanger the glass sheet and to cause it to fracture.

Also the substantially bubble-free nature of the bed ensures that the hot glass is not subjected to irregular forces such as could also give rise to fracture, or to changes in shape of the glass sheet during quenching, or to surface damage.

Previously it has been thought that, to obtain a high heat transfer coefficient between a fluidised bed and an article immersed in it, it is desirable to maintain a freely bubbling condition, such that the rapid and continuous movement of the particles can give rise to transfer of heat between the article and the bulk of the bed. This, it was thought, would not occur in a quiescent bed where the particle movement is less. However it has now been found that unexpectedly high heat transfer coefficients are obtained between a hot glass article and a cooler bed of fluidised particulate material in a quiescent uniformly expanded state and having selected characteristics.

It is found that there is thermal agitation of the uniformly fluidised particulate material at the hot glass surfaces when a hot glass sheet is quenched in the bed and there is greater rapidity of movement and turbulence of the fluidised particles in the region of the surfaces of the glass sheet than in the bulk of the bed. This results in a high rate of transfer of heat away from the glass surfaces. It is thought that particles which become heated by passing in proximity to the glass surfaces then move rapidly away from the glass sheet and lose heat to the fluidising air in the bulk of the bed.

The apparent density of the particles and their mean particle size are both important in determining the suitability of a non-compacted particulate material for constituting the fluidised bed in a quiescent uniformly expanded state employed in the method of the invention. Generally an appropriate non-compacted particulate material for fluidisation in a quiescent uniformly expanded state by fluidising air, when the bed is operating in ambient conditions of normal room temperature and pressure, is one for which the numerical product of the apparent particle density, in g/cm$^3$, and the mean particle size in $\mu$m, does not exceed about 220.

The degree of toughening of a glass sheet which is achieved by the method of the invention depends on the heat transfer coefficient between the fluidised particulate material and the hot glass sheet immersed in it. As already described there is thermal agitation on the hot glass surfaces which give rise to transfer of heat rapidly away from those surfaces. However the properties of the particles themselves also affect the magnitude of the heat transfer coefficient.

The maximum magnitude of average central tensile stress which can be achieved, which may be in the range 22 MN/m$^2$ to 115 MN/m$^2$, varies with the thickness of the glass and the heat transfer coefficient. By selection of a suitable material the heat transfer coefficient can be made high enough to produce toughened glass sheets having a central tensile stress as high as 40 MN/m$^2$ $^{1\,in\,glass}$ 2 mm thick, a central tensile stress as high as 50 MN/m$^2$ in glass 3.0 mm thick, and a central tensile stress as high as 104 MN/m$^2$ in glass which is 12 mm thickness. However even higher central tensile stresses than these have been achieved as is shown in some of the Examples.

The use of particles of non-compacted structure permits the selection of a material for the particles to give a fluidised bed having a sufficiently high thermal capacity per unit volume at minimum fluidisation to produce a high amount of toughening stress in the glass whilst avoiding difficulties in fluidisation of such a material in a quiescent uniformly expanded state of particulate fluidisation.

The amount of toughening stress produced in the glass using a fluidised bed comprising particles of a particular non-compacted material can be controlled by selection of the particle density. Particles of low density and of a particular size result in the production of a low amount of toughening stress in the glass, and the amount of toughening stress produced increases with increasing particle density up to the maximum density of particles of such size that they are still fluidised in said quiescent state.

Still further the invention provides a method for thermally toughening a glass sheet, comprising immersing a hot glass sheet in a fluidised bed in said quiescent state and constituted by particles of mean particle size in the range 5 $\mu$m to 120 $\mu$m and apparent particle density in the range of 0.3 g/cm$^3$ to 2.35 g/cm$^3$, the thermal capacity per unit volume of the bed at minimum fluidisation being in the range 0.02 cal/cm$^{3\circ}$ C. to 0.37 cal/cm$^{3\circ}$ C.

The apparent particle density within a range as set out above is the actual measured density of the particulate material taking into account the cavities within the particles, and is to be distinguished from the true density of the material itself.

The particles may be porous particles, for example porous particles of $\gamma$ alumina of mean particle size 64 $\mu$m and apparent particle density 2.2 g/cm$^2$, the thermal capacity per unit volume of the bed at minimum fluidisation being 0.21 cal/cm$^{3\circ}$ C.

In yet another embodiment the particles are of a porous form of aluminosilicate material of mean particle size in the range 60 $\mu$m to 75 $\mu$m and apparent particle density in the range 1.21 g/cm$^3$ to 1.22 g/cm$^3$, the thermal capacity per unit volume of the bed at minimum fluidisation being in the range 0.11 cal/cm$^{3\circ}$ C. to 0.19 cal/cm$^{3\circ}$ C.

Further the particles may be of porous powdered nickel of mean particle size 5 $\mu$m and apparent particle density 2.35 g/cm$^3$, the thermal capacity per unit volume of the bed at minimum fluidisation being 0.37 cal/cm$^{3\circ}$ C.

The particles may be hollow particles and in another embodiment of the invention the particles are hollow glass spheres of mean particle size in the range 77 $\mu$m to 120 $\mu$m and apparent particle density 0.38 g/cm$^3$, the thermal capacity per unit volume of the bed at minimum fluidisation being in the range 0.05 cal/cm$^{3\circ}$ C. to 0.06 cal/cm$^{3\circ}$ C.

In a further embodiment the particles are hollow carbon spheres of mean particle size 48$\mu$m, and apparent particle density 0.3 g/cm$^3$, the thermal capacity per unit volume of the bed at minimum fluidisation being 0.02 cal/cm$^{3\circ}$ C.

The invention also comprehends a fluidised bed for use as a quenching medium for thermally toughening a hot glass sheet, comprising particles of non-compacted particle structure which is such that the apparent density of the particles is less than the actual density of the material forming the particles. The mean particle size of the particles is in the range 5 $\mu$m to 120 $\mu$m, the apparent particle density is in the range 0.3 g/cm$^3$ to 2.35 1 g/cm$^3$, and the particles are so selected that the bed is in a quiescent uniformly expanded state of particulate fluidisation and has a thermal capacity per unit volume of bed at minimum fluidisation in the range 0.02 cal/cm$^{3\circ}$ C. to 0.37 cal/cm$^{3\circ}$ C.

BRIEF DESCRIPTION OF THE DRAWINGS

Some embodiment of the invention will now be described, by way of example, with reference to the accompanying drawings in which.

DESCRIPTION OF THE PREFERRED EMBODIMENTS

Figures 1, 2:
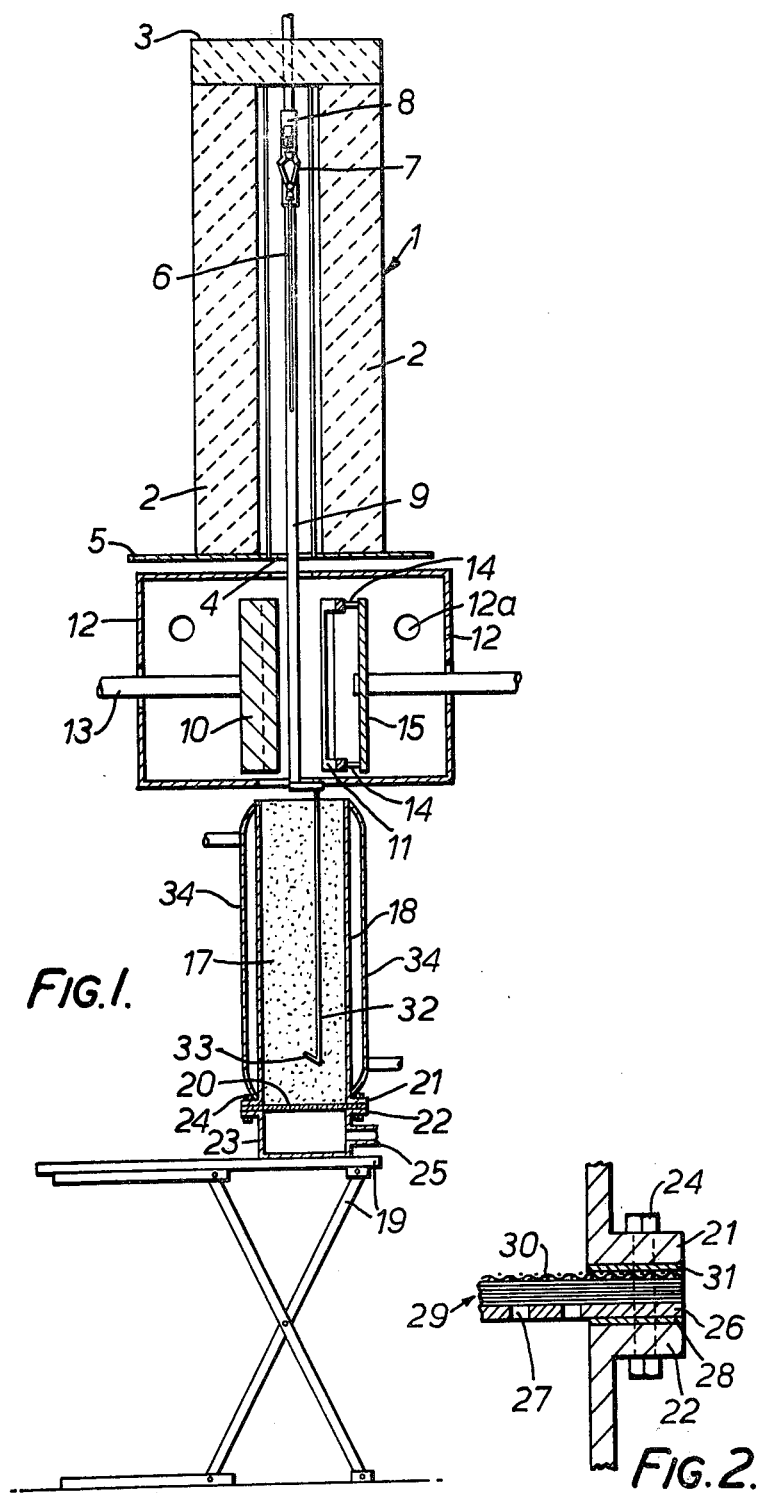
FIG. 1 illustrates diagrammatically a vertical section through apparatus for carrying out the method of the invention.
FIG. 2 is a detail in section of part of FIG. 1.

Referring to FIG. 1 of the drawings, a vertical toughening oven indicated generally at 1 has side walls 2 and a roof 3. The side walls 2 and the roof 3 are made of the usual refractory material and the bottom of the oven is open, being defined by an elongated aperture 4 in a baseplate 5 on which the oven 1 is supported. A movable shutter, not shown, is provided in known manner to close the aperture 4.

A sheet of glass 6 to be bent and subsequently thermally toughened is suspended in the oven 1 by tongs 7 which engage the upper margin of the sheet 6 and are held closed in customary manner by the weight of the glass sheet gripped between the tong points. The tongs 7 are suspended from a tong bar 8 which is suspended from a conventional hoist, not shown, and which runs on vertical guide rails 9 which extend downwardly from the oven to guide the lowering and raising of the tong bar 8.

A pair of bending dies 10 and 11 are located on either side of the path of the glass sheet 6 in a chamber 12, which is heated by hot gas flows through ducts 12a. The interior of the chamber 12 and the dies 10 and 11 are maintained at the same temperature as the temperature of the hot glass sheet 6 as it enters the chamber 12.

The die 10 is a solid male die mounted on a ram 13 and has a curved front face which defines the curvature to be imposed on the hot glass sheet. The die 11 is a ring frame female die carried by struts 14 mounted on a backing plate 15 which is mounted on a ram 16. The curvature of the die frame 11 matches the curvature of the face of the male die 10.

The guide rails 9 extend downwardly through the chamber 12 to either side of the bending dies towards a container for a gas-fluidised bed 17 of particulate refractory material in which the hot bent glass sheet is to be quenched. The container for the fluidised bed comprises an open-topped rectangular tank 18 which is mounted on a scissors-lift platform 19. When the platform 19 is in its raised position the top edge of the tank 18 is just below the bending dies 10 and 11.

A micro-porous membrane 20, which is described in greater detail with reference to FIG. 2, extends across the base of the tank 18. The edges of the membrane 20 are fixed between a flange 21 on the tank and a flange 22 on a plenum chamber 23 which forms the base of the tank. The flanges and the edges of the plate 20 are bolted together as indicated at 24. A gas inlet duct 25 is connected to the plenum chamber and fluidising air is supplied to the duct 25 at a regulated pressure. The membrane is so constructed that fluidising air flows uniformly into the fluidised bed over the whole base of the bed to maintain the bed in a quiescent uniformly expanded state of particulate fluidisation.

Particulate refractory material in the tank 18 is maintained in the quiescent uniformly expanded state of particulate fluidisation by the upward flow of air uniformly distributed by the porous membrane 20. The expanded bed is in a substantially bubble-free quiescent state and there are no regions of the bed which are not fluidised.

A preferred construction of micro-porous membrane is shown in FIG. 2 and is described in United Kingdom patent application No. 24124/76. This membrane comprises a steel plate 26 which has a regular distribution of holes 27. The margins of the plate are drilled to provide passages for bolts 24. A gasket 28 is located between the lower face of the margins of the plate and the flange 22 on the plenum chamber.

A number of layers 29 of strong micro-porous paper are laid on the plate 26. For example fifteen sheets of paper may be used. The membrane is completed with a woven wire mesh 30, for example stainless steel mesh which is laid on top of the paper. An upper gasket 31 is located between the margins of the wire mesh 30 and the flange 21 on the tank.

A basket for catching cullet may be located near the plate 20, and is designed so as not to interfere with the uniform flow of fluidising air upwardly from the membrane.

Referring again to FIG. 1, the guide rails 9 extend downwardly to a position below the bending dies and terminate in the region of the upper edge of the tank 18. A fixed frame indicated at 32 is mounted in the tank 18 and has upturned feet 33 at its base to receive the lower edge of a glass sheet lowered into the fluidised bed when the tong bar 8 is lowered beyond the bending dies by the hoist.

With the scissors-lift table 19 lowered and the tongs 7 and tong bar 8 in their lowermost position at the bottom of the guides 9, a cool glass sheet to be bent and toughened is loaded onto the tongs. The hoist then raises the suspended glass sheet into the oven 1 which is maintained at a temperature, for example 850° C., when toughening soda-lime-silica glass. The glass sheet is rapidly heated to a temperature near its softening point for example a temperature in the range 610° C. to 680° C.

When the glass sheet has reached a required temperature uniformly, the shutter closing the aperture 4 is opened and the hot glass sheet is lowered by the hoist into position between the open bending dies 10 and 11. The rams 13 and 16 are operated and the dies close to bend the sheet. When the required curvature has been imparted to the sheet the dies open and the hot bent glass sheet is rapidly lowered into the fluidised bed in the tank 18 which has been raised to quenching position by operation of the scissors-lift table 19 while the glass sheet was being heated in the oven 1.

When high quality laminated glass products are to be produced incorporating thermally toughened glass sheets produced by quenching in a fluidised bed an improvement in optical quality has been observed when the surfaces of the glass sheet are subjected to a preliminary air cooling just before the glass is immersed in the fluidised bed. This may be achieved by locating just above the upper edge of the tank 18 shallow blowing frames which direct cooling air onto the surfaces of the bent glass sheet as it leaves the bending dies and enters the fluidised bed.

The preliminary surface cooling is effective to "set-up" the surfaces of the glass sheet and thereby avoid minute variations in those surfaces such as have sometimes been observed and which may be due to the thermal agitation of the fluidised particulate material on the glass surfaces. Such preliminary surface cooling would however only usually be employed when the glass is being used for the production of laminates of high optical quality.

The fluidised bed is maintained at a suitable temperature for inducing a required central tensile stress in the glass, for example 30° C. to 150° C., by the water cooling jackets 34 on the flat longer walls of the tank 18, and by controlling the temperature of the fluidising air supplied to the plenum chamber 23. The jackets 34 acts as a heat sink which absorbs heat transferred through the bed from the hot glass sheet.

The lower edge of the hot glass sheet is uniformly chilled along its whole length as it enters the horizontal quiescent surface of the expanded fluidised bed so that there is no possibility of different tensile stresses being generated in different areas of the surface of that edge of the glass, such as could lead to fracture. During its descent into the bed the lower edge always contacts fluidised material in a quiescent uniformly expanded state of particulate fluidisation, and this uniform treatment of the lower edge, regardless of upward flow of particulate material which may be generated on the hot glass surfaces immediately they enter the fluidised bed, largely obviates fracture and the problems of dealing with glass fragments in the bed. This together with the avoidance of losses of glass sheets due to change of shape of the glass sheets and/or damage to the surface quality, ensures a commercially viable yield of toughened glasses.

Localised thermal agitation of the fluidised bed takes place on the hot glass surfaces, perhaps by rapid gas expansion in a manner akin to the boiling of a liquid. The agitation ensures that there is adequate heat transfer away from the glass surfaces into the bulk of the fluidised bed, for example heat transfer coefficients between the bed and the glass sheet in the range 0.003 cal/cm$^{2\circ}$ C. sec to 0.02 cal/cm$^{2\circ}$ C. sec are obtained. The heat transfer continues until well after the glass has cooled below its strain point, with sufficient severity to ensure that the centre-to-surface temperature gradients are maintained as the glass cools through its strain point, and the toughening stresses are developed thereafter during the continuous cooling of the glass while it is still immersed in the bed.

The agitation of the fluidised material at the glass surfaces sets up currents in the bulk of the bed which ensure continual dissipation to the remoter parts of the bed of the heat which is extracted from the glass by the thermal agitation of the bed in the region immediately surrounding the glass sheet. The water cooling jackets 34, acting as a heat sink, keep those remoter parts of the bed cool.

The sheet engages the feet 33 of the frame 32 at the bottom of its descent, thereby releasing the tongs 8. The glass sheet then rests on the frame 32 while the glass sheet cools in the fluidised bed. The glass sheet remains in the fluidised bed until it is cooled sufficiently to be handled and the tank 18 is lowered by lowering the scissors-lift platform to expose the fixed frame 32 and the supported toughened glass sheet which is then removed for subsequent cooling to room temperature.

Figure 3:
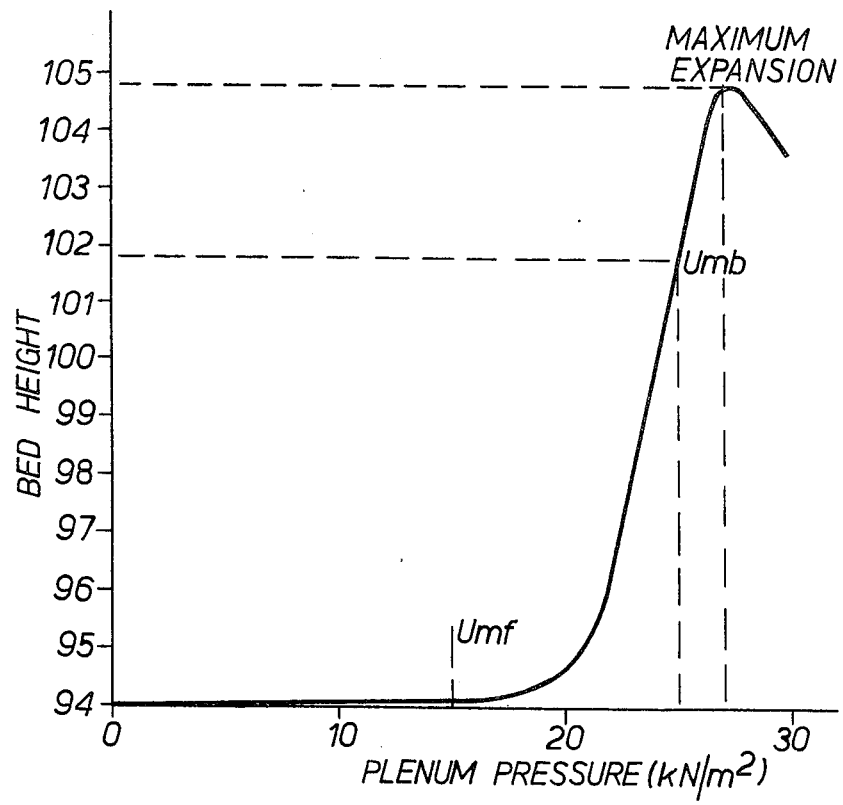
FIG. 3 is a graph which illustrates a characteristic of a gas-fluidised bed in a quiescent uniformly expanded state of particulate fluidisation, which is employed in carrying out the invention.

The nature of the quiescent uniformly expanded state of particulate fluidisation of the fluidised bed is illustrated in FIG. 3 which is a plot of plenum pressure, that is, the pressure in the plenum chamber, against the height of the bed in the tank 18 using $\gamma$ alumina particles as described in Example 2, set out below, and with the tank size and fluidisation conditions of Example 2, and the temperature of the bed at 80° C.

When the plenum pressure reached 15 kN/m$^2$ expansion of the bed began, the velocity of the fluidising air through the bed then being sufficient to produce incipient fluidisation. That is, at this lower limit of gas velocity the $\gamma$ alunina particles just become suspended in the upwardly flowing air.

Because of the use of a high pressure drop and a uniformly micro-porous membrane of the kind illustrated in FIG. 2, in which the pressure drop across the membrane is in excess of 60% of the plenum pressure, there is uniform distribution of fluidising air flowing upwardly from the upper face of the membrane. This high pressure drop across the membrane makes possible sensitive regulation of the velocity of gas flow upwardly through the particulate material, thereby permitting regulation of the state of quiescent fluidisation of the $\gamma$ alumina between the minimum fluidisation state just described and a state of maximum expansion of the bed in which dense-phase fluidisation is maintained.

This sensitive regulation to the gas velocity is achieved by regulation of the plenum pressure in the chamber 23, and as the plenum pressure increases there is no sudden or discontinuous change in the state of the bed. Rather the quiescent uniformly expanded state of the bed persists, as illustrated in FIG. 3, as the plenum pressure is increased to about 25 kN/m$^2$ and the bed expands to a height of about 102 cm in the tank.

At this plenum pressure the first clearly recognisable bubble, for example about 5 mm in diameter, may be observed breaking the surface of the quiescent bed, and this velocity of the fluidising air may be considered as the minimum bubbling velocity.

Because of the use of the high-pressure drop membrane 20, it has been possible to observe that this minimum bubbling velocity is not necessarily the gas velocity producing maximum expansion of the bed, and further regulation of the plenum pressure up to 27 kN/m$^2$ produced a maximum bed height of 105 cm. While this increase in plenum pressure up to 27 kN/m$^2$ was effected more small bubbles were observed to break the bed surface, but the small random bubbles were not so significant as to adversely affect the capacity of the bed for quenching hot sheets of glass, in particular thicker sheets of glass.

With increase of the plenum pressure beyond 27 kN/m$^2$, persistent bubbling of the bed occured and a tendency of the bed to collapse to a height below its maximum height of 105 cm, was observed. In this state the bed was unsuitable for toughening hot glass sheets.

In this example therefore the uniform quiescent expanded state of the fluidised bed of $\gamma$ alumina, which was effective for toughening hot glass sheets is represented by the region of the curve of FIG. 3 lying between plenum pressures of 15 kN/m$^2$ and 27 kN/m$^2$, in which region sensitive control of the state of fluidisation was possible, with consequential control of the uniform toughening stresses induced in the glass.

The effective heat transfer coefficient of the fluidised bed relative to the hot glass is determined by the properties of the fluidising gas, usually air, the gas velocity in the bed, the properties of the particulate refractory material notably the range of sizes of the particles, the mean particle size, the density of the particles and, in the case when the particles contain cavities, that is have a certain porosity or hollow structure, the density of the material of the particles. The heat transfer coefficient also depends on the temperatures of the glass and the bed, since if there is only a small difference between these temperatures, there will be little agitation on the surface of the glass and the effective heat transfer coefficient will be comparatively low.

Other factors affecting the heat transfer coefficient are the specific heat of the particles, and their average heat capacity. In each of the following examples the numerical value of the product of the particle density, in $g/cm^3$, and the mean particle size in $\mu m$, is less than 220. This is a criterion which may be used for assessing the suitability of a particulate material, that is its capability of being fluidised by air in a quiescent uniformly expanded state of particulate fluidisation, operating with ambient conditions of normal temperature and pressure.

Some examples of toughening of glass sheets of thickness in the range 2.3 mm to 12 mm, using apparatus as in FIGS. 1 and 2, and a uniform quiescent expanded bed are set out below. In each of the following Examples 1 to 11 the edges of the glass sheet are finished by being rounded using a fine diamond grit wheel.

EXAMPLE 1

The particulate refractory as a $\gamma$ form of porous alumina the properties of which are as follows:

| | |
|---|---|
| Mean particle size (d) | = 64 $\mu m$ |
| Particle size range | = 20 to 160 $\mu m$ |
| Particle density (p) | = 2.2 $g/cm^3$ |
| Material density | = 3.97 $g/cm^3$ |
| $p \times d$ | = 141 |
| Material specific heat | = 0.2 $cal/g° C$ |
| Thermal capacity per unit volume of bed at minimum fluidisation | = 0.21 $cal/cm^{3°} C$ |
| Velocity of fluidising air in bed | = 0.54 cm/s |

With the bed maintained at 40° C. the degree of toughening of glass sheets of thickness in the range 2.3 mm to 12 mm with an initial glass temperature in the range 610° C. to 670° C. was as follows:

| Initial Glass Temperature (° C) | Glass Thickness (mm) | Average Central Tensile Stress ($MN/m^2$) |
|---|---|---|
| 610 | 2.3 | 37 |
| 610 | 10 | 92 |
| 610 | 12 | 93.5 |
| 630 | 2.3 | 42.5 |
| 630 | 6 | 72.5 |
| 630 | 12 | 96 |
| 650 | 2.3 | 46 |
| 650 | 4 | 64 |
| 650 | 6 | 75.7 |
| 650 | 8 | 92.7 |
| 650 | 10 | 96 |
| 650 | 12 | 99 |
| 670 | 2.3 | 44 |
| 670 | 6 | 75 |
| 670 | 10 | 100 |

The effective heat transfer coefficient between the bed and the glass sheets lay in the range 0.01 $cal/cm^{2°}$ C. sec to 0.012 $cal/cm^{2°}$ C. sec.

EXAMPLE 2

In a particular production run using the same $\gamma$ form of porous alumina as in Example 1, bent sheetss of glass 2.3 mm thick were toughened. These sheets were subsequently used as a component of a laminated windscreen for automobiles.

The properties of the $\gamma$ alumina are as follow:

| | |
|---|---|
| Mean particle size (d) | = 64 $\mu m$ |
| Particle size range | = 30 to 150 $\mu m$ |
| Particle density (p) | = 2.2 $g/cm^3$ |
| Material density | = 3.9 $g/cm^3$ |
| $p \times d$ | = 141 |
| Size of tank holding fluidised bed | = 38 cm × 215 cm × 105 cm deep |
| Plenum pressure | = 24 $kN/m^2$ |
| Pressure drop across membrane | = 15 $kN/m^2$ |
| Pressure drop across membrane | = 60% of plenum pressure |
| Rate of flow of fluidising air | = 0.175 $m^3$/min |
| Velocity of fluidising air in bed | = 0.36 cm/s |
| Temperature of fluidised bed | = 60° C |
| Temperature of glass: top edge | = 650° C to 655° C |
| bottom edge | = 670° C to 675° C |
| Resulting uniform central tensile stress in glass | = 38$MN/m^2$ to 40$MN/m^2$ |

The effective heat transfer coefficient between the bed and the glass sheets lay in the range 0.01 $cal/cm^{2°}$ C. sec to 0.012 $cal/cm^{2°}$ C. sec.

EXAMPLE 3

In another production run, sheets of glass intended as components of laminated aircraft windscreens and of thickness 3 mm, 4 mm, 6 mm, 8mm, and 10 mm, were toughened in a uniform quiescent expanded fluidised bed of $\gamma$ alumina. The same $\gamma$ form of porous alumina was used as in Examples 1 and 2.

| | |
|---|---|
| Size of tank holding fluidised bed | = 45cm × 245cm × 150cm deep |
| Plenum pressure | = 30 $kN/m^2$ |
| Pressure drop across membrane | = 19.5 $kN/m^2$ |
| Pressure drop across membrane | = 65% in plenum pressure |
| Rate of flow of fluidising air | = 0.34 $m^3$/min |
| Velocity of fluidising air in bed | = 0.51 cm/s |
| Temperature of fluidised bed | = 60° C |
| Temperature of glass | = 645° C to 540° C |

| Thickness | Central Tensile Stress |
|---|---|
| 3.0 mm | 48 $MN/m^2$ |
| 4.0 mm | 53 $MN/m^2$ |
| 10.0 mm | 80 $MN/m^2$ |

The effective heat transfer coefficient between the bed and the glass sheets lay in the range 0.01 $cal/cm^{2°}$ C. sec to 0.012 $cal/cm^{2°}$ C. sec.

EXAMPLE 4

The particulate refractory material is a porous powdered aluminosilicate material, each particle containing 13% by weight alumina and 86% silica. The powdered material has the following properties:

| Particle size range | = | up to 150 μm |
| --- | --- | --- |
| Mean particle size (d) | = | 60 μm |
| Particle density (p) | = | 1.22 g/cm³ |
| Material density | = | 2.3 g/cm³ |
| p × d | = | 73 |
| Material specific heat | = | 0.38 cal/g ° C |
| Thermal capacity per unit volume of bed at minimum fluidisation | = | 0.19 cal/cm³ ° C |
| Velocity of fluidising air in bed | = | 0.21 cm/s |

With the bed maintained at 40° C., the degree of toughening of glass sheets of thickness in the range 2.3 mm to 10 mm was as follows:

| Initial Glass Temperature (° C) | Glass Thickness (mm) | Average Central Tensile Stress (MN/m²) |
| --- | --- | --- |
| 650 | 2.3 | 30.8 |
| 650 | 4 | 44 |
| 650 | 6 | 62.3 |
| 650 | 8 | 73 |
| 650 | 10 | 79 |

The effective heat transfer coefficient between the bed and the glass sheets lay in the range 0.007 cal/cm²° C. sec to 0.009 cal/cm²° C. sec.

EXAMPLE 5

Another form of a porous composite aluminosilicate material was used. Each particle is porous and contains 29% by weight alumina and 69% silica. This porous powder has the following properties:

| Particle size range | = | up to 150 μm |
| --- | --- | --- |
| Mean Particle size (d) | = | 75 μm |
| Particle density (p) | = | 1.21 g/cm³ |
| p × d | = | 91 |
| Material density | = | 2.3 g/cm³ |
| Material specific heat | = | 0.2 cal/g ° C |
| Thermal capacity per unit volume of bed at minimum fluidisation | = | 0.11 cal/cm³ ° C |
| Velocity of fluidising air in bed | = | 0.33 cm/s |

With the bed maintained at 40° C., and the initial glass temperature in the range 610° C., the degree of toughening of glass sheets of thickness in the range 2.3 mm to 10 mm was as follows:

| Initial Glass Temperature (° C) | Glass Thickness (mm) | Average Central Tensile Stress (MN/m²) |
| --- | --- | --- |
| 610 | 6 | 51 |
| 610 | 10 | 74 |
| 630 | 2.3 | 31.5 |
| 630 | 6 | 53 |
| 650 | 2.3 | 33.7 |
| 650 | 4 | 48.3 |
| 650 | 6 | 56 |
| 650 | 8 | 71.3 |
| 650 | 10 | 84 |
| 670 | 2.3 | 32 |
| 670 | 6 | 58 |
| 670 | 10 | 81.5 |

The effective heat transfer coefficient between the bed and the glass sheets lay in the range 0.007 cal/cm²° C. sec. to 0.01 cal/cm²° C. sec.

EXAMPLE 6

A "Fillite" powder, which comprises the hollow glass spheres derived from pulverised fuel ash from power station boilers, was selected to have the following properties:

| Particulate size range | = | 20 to 160 μm |
| --- | --- | --- |
| Mean Particle size (d) | = | 77 μm |
| Particle density (p) | = | 0.38 g/cm³ |
| p × d | = | 29 |
| Material density | = | 2.6 g/cm³ |
| Material specific heat | = | 0.18 cal/g ° C |
| Thermal capacity per unit volume of bed at minimum fluidisation | = | 0.05 cal/cm³ ° C |
| The fluidisation velocity of the air in the Fillite | = | 0.11 cm/s |

The degree of toughening induced in the glass sheets which were thermally toughened in this fluidised bed can be represented by an average central tensile stress which was measured in conventional manner and the results achieved for a range of glass thickness from 4 mm to 12 mm, with different initial glass temperatures in the range 610° C. to 670° C. and with the temperature of the fluidised bed at 40° C. are as follows:

| Initial Glass Temperature (α C) | Glass Thickness (mm) | Average Central Tensile Stress (MN/m²) |
| --- | --- | --- |
| 610 | 10 | 40 |
| 610 | 12 | 41 |
| 630 | 6 | 30 |
| 630 | 12 | 45 |
| 650 | 4 | 22.4 |
| 650 | 6 | 32 |
| 650 | 8 | 37 |
| 650 | 10 | 39 |
| 650 | 12 | 48.5 |
| 670 | 6 | 35 |
| 670 | 10 | 50 |

The effective heat transfer coefficient between the bed and the glass sheets lay in the range 0.003 cal/cm²° C. sec. to 0.004 cal/cm²° C. sec.

EXAMPLE 7

Another grade of "Fillite" material was used having the following properties:

| Mean particle size (d) | = | 120 μm |
| --- | --- | --- |
| Particle density (p) | = | 0.38 g/cm³ |
| Material density | = | 2.6 g/cm³ |
| p × d | = | 45 |
| Material specific heat | = | 0.18 cal/g ° C |
| Thermal capacity per unit volume of bed at minimum fluidisation | = | 0.06 cal/cm³ ° C |
| Velocity of fluidising air in bed | = | 0.27 cm/s |

With initial glass temperatures in the range 630° C. to 670° C. and with the bed at about 40° C., stresses induced in glass sheets of thickness 6 mm to 10 mm were as follows:

| Initial Glass Temperature (° C) | Glass Thickness (mm) | Average Central Tensile Stress (MN/m²) |
| --- | --- | --- |
| 630 | 6 | 42 |
| 630 | 8 | 49 |
| 650 | 6 | 45.5 |
| 650 | 8 | 51 |
| 650 | 10 | 63 |
| 670 | 6 | 48 |
| 670 | 8 | 53 |

The effective heat transfer coefficient between the bed and the glass sheets lay in the range 0.005 to 0.006 cal/cm$^3$° C. sec.

EXAMPLE 8

The particulate refractory material used was hollow carbon spheres of the kind known as "Carbospheres" having the following properties:

| | | |
|---|---|---|
| Particle size range | = | 5 to 150 μm |
| Mean particle size (d) | = | 48 μm |
| Particle density (p) | = | 0.3 g/cm$^3$ |
| p × d | = | 14.4 |
| Material density | = | 2.3 g/cm$^3$ |
| Material specific heat | = | 0.123 cal/g ° C |
| Thermal capacity per unit volume of bed at minimum fluidisation | = | 0.02 cal/gm$^3$ ° C |
| Velocity of fluidising air in bed | = | 0.33 gm/s |

The degree of toughening of glass sheets quenched in this fluidised bed maintained at about 40° C. are as follows:

| Initial Glass Temperature (° C) | Glass Thickness (mm) | Average Central Tensile Stress (MN/m$^2$) |
|---|---|---|
| 610 | 10 | 44 |
| 630 | 6 | 34 |
| 650 | 4 | 26.3 |
| 650 | 6 | 32.7 |
| 650 | 8 | 40 |
| 650 | 10 | 45 |
| 670 | 6 | 36 |
| 670 | 10 | 46 |

The effective heat transfer coefficient between the bed and the glass sheets lay in the range 0.0035 cal/cm$^{2°}$ C. sec. to 0.004 cal/cm$^{2°}$ C. sec.

EXAMPLE 9

The particulate refractory material was porous powdered nickel having the following properties:

| | | |
|---|---|---|
| Mean particle size (d) | = | 5 μm |
| Particle density (p) | = | 2.35 g/cm$^3$ |
| Material density | = | 8.9 g/cm$^3$ |
| p × d | = | 12 |
| Material specific heat | = | 0.106 cal/g ° C |
| Thermal capacity per unit volume of bed minimum fluidisation state | = | 0.37 cal/cm$^3$ ° C |
| Velocity of fluidising air in bed | = | 0.045 cm/s |

Glass sheets of thickness in the range 2.3 mm to 6 mm at an initial temperature of 650° C. were quenched in a fluidised bed of this porous nickel powder which was in a quiescent state and was maintained at about 40° C. The degree of toughening represented by average central tensile stress was as follows:

| Glass Thickness (mm) | Average Central Tensile Stress (MN/m$^2$) |
|---|---|
| 2.3 | 77 |
| 3 | 95 |
| 6 | 115 |

The effective heat transfer coefficient between the bed and the glass sheets was 0.02 cal/cm$^{2°}$ C. sec.

To illustrate the high yield of unbroken and undistorted glass sheets obtained when using a gas-fluidised bed according to the invention in a quiescent uniformly expanded state of particulate fluidisation, as compared with the yield when using a bed in a bubbling state of fluidisation, a number of similar sheets of glass of size 30 cm × 30 cm and of thickness 2 mm, 6 mm and 12 mm were treated. The glass sheets had an edge finish in which the edges of the glass sheets were chamfered using a bonded silicon carbide grinding wheel. This gave a rougher edge finish than that of the glass sheets of Examples 1 to 11 which were finished with a diamond grit wheel. The invention made a high yield possible even with this rougher, and cheaper, edge finish.

Each sheet was heated to a temperature as set out below and then immersed in a fluidised bed of the γ form of porous alumina described in Example 1.

For the purpose of these yield tests some hot glass sheets were immersed in a fluidised bed in a quiescent state as described in Example 1. A bubbling state of fluidisation of the bed was then produced by increasing the fluidising gas velocity above the value producing maximum expansion of the bed, and an equal number of hot glass sheets were immersed in the bubbling bed.

The yield of dimensionally acceptable unbroken glass sheets, as a percentage of the total number of sheets treated, was as follows:

| | Glass thickness = 2 mm | |
|---|---|---|
| Glass Temperature | Yield | |
| ° C | QUIESCENT BED | BUBBLING BED |
| 645 | 95% | 52% |
| 660 | 100% | 80% |

| | Glass thickness = 6 mm | |
|---|---|---|
| Glass Temperature | Yield | |
| ° C | QUIESCENT BED | BUBBLING BED |
| 640 | 80% | 40% |
| 645 | 100% | 60% |

| | Glass thickness = 12 mm | |
|---|---|---|
| Glass Temperature | Yield | |
| ° C | QUIESCENT BEd | BUBBLING BED |
| 635 | 80% | 40% |
| 645 | 100% | 75% |

Although the above examples were obtained using 30 cm x 30 cm square sheets of glass even lower yields with respect to fracture and distortion result when treating large sheets of glass such as of motor vehicle windscreen size in a bubbling fluidised bed. In contrast the yields obtained when treating such larger sheets of glass in a quiescent fluidised bed are at least as good as those of the examples referred to above.

The value of the stresses induced in the glass decreases as the bed temperature increases and in the limit, which may be about 300° C. or higher, the stresses in the glass are such that the glass is annealed rather than toughened. Heating and/or cooling elements may be provided on the side walls of the tank 18 for controlling the temperature of the fluidised bed. In all the Examples the sheets of glass were commercial soda-lime-silica glass such as is used in the manufacture of aircraft windscreen panels, automobile windscreens, ship's windows and architectural panels. Glass of other compositions can be toughened or annealed in the same way using the method of the invention. Also articles other than glass sheets, for example pressed glass articles such as insulators or lens blanks, or blown glass articles can be toughened or annealed by the method of the invention.

A fluidised bed according to the invention may be used for other thermal treatments of glass, for example for the heating of a relatively cold glass article prior to a further processing step, heat transfer from the fluidised material to the glass which is immersed in the bed being facilitated without damage to the glass, even when the glass has attained a temperature at which it is susceptible to damage by irregular forces.

The invention may also be used for thermally toughening glass sheets which have been heated and bent while supported in a near-vertical position, and advanced along a horizontal path, as described in United Kingdom patent application No. 34703/73 (specification No. 1,442,316). In the apparatus described in that application the bending dies are enclosed in a heated chamber which is tilted from an inclined position to a position in which the bent glass sheet between the bending dies is vertical and can be lowered vertically into a quiescent fluidised bed of the kind described above.

In another process employing the invention a glass sheet may be heated by immersing the sheet in a fluidised bed which is at a sufficiently high temperature to heat the glass to pre-bending temperature. After removal from the hot bed the sheet is bent, and the bent sheet is then toughened by immersing the glass in a fluidised bed which is in a quiescent uniformly expanded state of particulate fluidisation as described above. The glass sheet could be carried by the same set of tongs throughout the heating bending and toughening, the tongs being adjustably mounted so that they move to follow the bent shape of the glass. In another arrangement each glass sheet is suspended from non-adjustable tongs for heating and is transferred to lower-edge support during bending in the manner described in United Kingdom specification No. 1,442,316, the bent glass sheet being engaged by a second set of tongs which are arranged according to the bent shape of the glass, and lowered into the quiescent fluidised bed for quenching.

We claim:

1. A method of thermally treating glass in which the glass is contacted with a gas-fluidised particulate material placed in a quiescent uniformly expanded state of particulate fluidisation by gas fed to the particulate material under pressure from an external source, with control of the gas feed being such that the gas velocity while the glass is being contacted by said particulate material is between the velocity corresponding to incipient fluidisation and that velocity corresponding to maximum expansion, wherein the particulate material is comprised of buoyant particles of non-compacted particle structure which is such that the apparent density of the particles is less than the actual density of the material forming the particles and wherein the material forming the buoyant particles and the temperature of the material are so selected that the heat transfer coefficient of the fluidised material is sufficient to produce a desired thermal treatment of the glass at it cools in the material.

2. A method of thermally toughening glass, comprising heating the glass, and immersing the hot glass in a gas-fluidised bed of buoyant particles of non-compacted particle structure which is such that the apparent density of the particles is less than the actual density of the material forming the particles and the buoyant particles constitute a gas-fluidised bed placed in a quiescent uniformly expanded state of particulate fluidisation by gas entering the bed from a plenum chamber, with control of the plenum pressure while the glass is being contacted by the bed being such that the gas velocity is between that velocity corresponding to incipient fluidisation and that velocity corresponding to maximum expansion of the bed, the material forming the particles and the temperature of the bed being so selected that the heat transfer coefficient of the fluidised bed is sufficient to induce desired toughening stresses in the glass as it cools in the bed.

3. A method according to claim 2, for thermally toughening a glass sheet, comprising immersing a hot glass sheet in a fluidised bed in said quiescent state and constituted by particles of mean particle size in the range 5$\mu$m to 120$\mu$m and apparent particle density in the range 0.3 g/cm$^3$ to 2.35 g/cm$^3$, the thermal capacity per unit volume of the bed at minimum fluidisation being in the range 0.02 cal/cm$^{3\circ}$ C. to 0.37 cal/cm$^{3\circ}$ C.

4. A method of thermally toughening glass, comprising heating the glass, and immersing the hot glass in a gas-fluidised bed of porous particles placed in a quiescent uniformly expanded state of particulate fluidisation by gas fed to the bed under pressure from an external source, with control of the gas feed pressure while the glass is being contacted by the bed being such that the gas velocity is between that velocity corresponding to incipient fluidisation and that velocity corresponding to maximum expansion of the bed, the material forming the particles and the temperature of the bed being so selected that the heat transfer coefficient of the fluidised bed is sufficient to induce desired toughening stresses in the glass as it cools in the bed.

5. A method according to claim 3, wherein the particles are porous particles of $\gamma$ alumina of mean particle size 64$\mu$m and apparent particle density 2.2 g/cm$^2$, the thermal capacity per unit volume of the bed at minimum fluidisation being 0.21 cal/cm$^{3\circ}$ C.

6. A method according to claim 3, wherein the particles are of a porous form of aluminosilicate material of mean particle size in the range 60$\mu$m to 75$\mu$m and apparent particle density in the range 1.21 g/cm$^3$ to 1.22 g/cm$^3$, the thermal capacity per unit volume of the bed at minimum fluidisation being in the range 0.11 cal/cm$^{3\circ}$ C. to 0.19 cal/cm$^{3\circ}$ C.

7. A method according to claim 4, wherein the particles are of porous powdered nickel of mean particle size 5 $\mu$m and apparent particle density 2.35 g/cm$^3$, the thermal capacity per unit volume of the bed at minimum fluidisation being 0.37 cal/cm$^{3\circ}$ C.

8. A method of thermally toughening glass comprising heating the glass, and immersing the hot glass in a gas-fluidised bed of hollow particles placed in a quiescent uniformly expanded state of particulate fluidisation, by gas entering the bed from a plenum chamber, with control of the plenum pressure while the glass is being contacted by the bed being such that the gas velocity is between the velocity corresponding to the incipient fluidisation and that velocity corresponding to maximum expansion of the bed, the material forming the particles and the temperature of the bed being so selected that the heat transfer coefficient of the fluidised bed is sufficient to induce desired toughening stresses in the glass as it cools in the bed.

9. A method according to claim 8, wherein the particles are hollow glass spheres of mean particle size in the range 77$\mu$m to 120$\mu$m and apparent particle density 0.38 g/cm$^3$, the thermal capacity per unit volume of the bed at minimum fluidisation being in the range 0.05 cal/cm$^{3\circ}$ C. to 0.06 cal/cm$^{3\circ}$ C.

10. A method according to claim 8, wherein the particles are hollow carbon spheres of mean particle size 48μm and apparent particle density 0.3 g/cm$^3$, the thermal capacity per unit volume of the bed at minimum fluidisation being 0.02 cal/cm$^3$° C.

11. A method of thermally treating glass comprising:
   immersing the glass in a gas-fluidised particulate material comprised of buoyant particles of non-compacted particle structure which is such that the apparent density of the particles is less than the actual density of the material forming the particles;
   placing said particulate material prior to said immersion, in a quiescent uniformly expanded state of particulate fluidisation through flow control of fluidising gas to engender a uniform distribution of fluidising gas in the particulate material at a gas flow velocity through the particulate material between that velocity corresponding to incipient fluidisation and that velocity corresponding to maximum expansion of the particulate material; and
   selecting the material forming the buoyant particles and the temperature of the material so that the heat transfer coefficient of the fluidised material is sufficient to produce a desired thermal treatment of the glass as it cools in the material.

12. A method of thermally treating glass comprising:
   contacting the glass with a gas-fluidised particulate material comprised of buoyant particles of non-compacted particle structure which is such that the apparent density of the particles is less than the actual density of the material forming the particles, to effect heat transfer between the surfaces of the glass and the fluidised particulate material;
   feeding fluidising gas to the particulate material through a membrane from an external source;
   placing the gas-fluidised particulate material in a quiescent uniformly expanded state of particulate fluidisation through control of gas feed through the membrane to provide uniform distribution of fluidising gas flow upwardly from the membrane at a gas velocity between that velocity corresponding to incipient fluidisation and that velocity corresponding to maximum expansion; and
   selecting the material forming the buoyant particles and the temperature of the material so that the heat transfer coefficient of the fluidised material is sufficient to produce a desired thermal treatment of the glass as it cools in the material.

13. A method according to claim 12, wherein the gas is fed through the membrane from a plenum chamber, and the plenum pressure in the plenum chamber is regulated to control the velocity of said upward fluidising gas flow from the membrane.

14. A method according to claim 13, wherein regulation of the plenum pressure is effected by regulating the pressure of the supply of fluidising gas to the plenum chamber.

15. A method of thermally toughening glass comprising:
   heating the glass to a temperature above its strain point;
   immersing the hot glass in a gas-fluidised bed of particulate material comprised of buoyant particles of non-compacted particle structure which is such that the apparent density of the particles is less than the actual density of the material forming the particles;
   placing the gas-fluidised material, prior to said immersion, in a quiescent uniformly expanded state of particulate fluidisation by regulation of the plenum pressure in a plenum chamber, from which gas enters the bed through a membrane, such that the velocity of the flow of fluidising gas upwardly from the membrane is between that velocity corresponding to incipient fluidisation and that velocity corresponding to maximum expansion of the bed; and
   selecting the material forming the buoyant particles and the temperature of the material so that the heat transfer coefficient of the fluidised material is sufficient to produce a desired thermal toughening of the glass as it cools in the material.

16. A method according to claim 15, wherein regulation of the plenum pressure in the plenum chamber is effected by regulating the pressure of the supply of fluidising gas to the plenum chamber.

17. A method of thermally toughening a glass sheet comprising:
   heating the glass sheet to a temperature above its strain point;
   lowering the hot glass sheet into a gas-fluidised bed of particulate material comprised of buoyant particles of non-compacted particle structure which is such that the apparent density of the particles is less than the actual density of the material forming the particles;
   placing the gas-fluidised particulate material of the bed, prior to immersion of the hot glass sheet in the bed, in a quiescent uniformly expanded state of particulate fluidisation with a quiescent
   surface by control of gas feed to the bed such that the gas velocity in the bed is between that velocity corresponding to incipient fluidisation and that velocity corresponding to maximum expansion of the bed and the lower edge of the hot glass sheet is uniformly chilled as it enters the quiescent surface of the expanded bed; and
   selecting the material forming the buoyant particles and the temperature of the material so that the heat transfer coefficient of the fluidised material is sufficient to produce a desired thermal toughening of the glass as it cools in the material.

18. A method of thermally toughening a glass sheet comprising:
   heating the glass sheet to a temperature above its strain point;
   lowering the hot glass sheet into a gas-fluidised bed of particulate material comprised of buoyant particles of non-compacted particle structure which is such that the apparent density of the particles is less than the actual density of the material forming the particles;
   placing the gas-fluidised bed, prior to lowering of the hot glass sheet into the bed, in a quiescent uniformly expanded state of particulate fluidisation by control of gas feed to the bed such that the gas velocity in the bed is at least that velocity corresponding to incipient fluidisation and is a velocity at which the expanded bed has a horizontal quiescent surface which chills the lower edge of the glass sheet uniformly as the lower edge of the sheet enters that horizontal quiescent surface; and
   selecting the material forming the buoyant particles and the temperature of the material so that the heat transfer coefficient of the fluidised material is sufficient to produce a desired thermal toughening of the glass as it cools in the material.

* * * * *